US011012853B2

(12) United States Patent
Donahue et al.

(10) Patent No.: US 11,012,853 B2
(45) Date of Patent: May 18, 2021

(54) SECURE SOFTWARE UPDATE IN A WIRELESS MESH RADIO NETWORK USING PEER-TO-PEER FILE SHARING

(71) Applicant: Parallel Wireless, Inc., Nashua, NH (US)

(72) Inventors: Daniel P. Donahue, Methuen, MA (US); Robert Getschmann, Exeter, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/689,821

(22) Filed: Nov. 20, 2019

(65) Prior Publication Data
US 2020/0162892 A1 May 21, 2020

Related U.S. Application Data

(60) Provisional application No. 62/769,882, filed on Nov. 20, 2018.

(51) Int. Cl.
| | |
|---|---|
| *H04W 84/18* | (2009.01) |
| *H04W 8/24* | (2009.01) |
| *G06F 8/65* | (2018.01) |
| *H04L 5/00* | (2006.01) |
| *H04W 12/06* | (2021.01) |
| *H04L 12/751* | (2013.01) |

(52) U.S. Cl.
CPC .............. *H04W 8/245* (2013.01); *G06F 8/65* (2013.01); *H04L 5/0055* (2013.01); *H04L 45/02* (2013.01); *H04W 12/06* (2013.01); *H04W 84/18* (2013.01)

(58) Field of Classification Search
CPC ............. H04W 12/001; H04W 12/002; H04W 12/0023; H04W 12/0027; H04W 12/003; H04W 12/06; H04W 12/08; H04W 4/44; H04W 4/46; H04W 4/50; H04W 4/70; H04W 4/80; H04W 84/18; H04W 8/245
See application file for complete search history.

(56) References Cited

U.S. PATENT DOCUMENTS

| | | | |
|---|---|---|---|
| 5,903,566 A | 5/1999 | Flammer, III | |
| 7,376,870 B2 | 5/2008 | Kataria et al. | |
| 7,571,227 B1 | 8/2009 | Pabla | |
| 8,320,904 B1 * | 11/2012 | Celentano | H04W 24/08 455/423 |
| 10,263,803 B2 * | 4/2019 | Ansari | G06F 16/64 |
| 10,447,483 B1 * | 10/2019 | Su | H04L 9/0643 |

(Continued)

*Primary Examiner* — Jean A Gelin
(74) *Attorney, Agent, or Firm* — Michael Y. Saji; David W. Rouille

(57) ABSTRACT

Systems, methods and computer software are disclosed for performing a secure software update in a mesh network. In one embodiment, a method is disclosed, comprising: receiving, at each node of a network, a notification from a coordinating server, wherein each node of the network is listening for an image available notification; receiving, at a first node of the network, the image available notification; downloading and installing a software update image by the first node of the network; broadcasting, at the first node of the network, the image available notification to other peer nodes of the first node of the network; and downloading and installing the software update image from the first node of the network by at least one other peer node of the network.

18 Claims, 7 Drawing Sheets

(56) References Cited

U.S. PATENT DOCUMENTS

| | | | |
|---|---|---|---|
| 2004/0230373 A1* | 11/2004 | Tzamaloukas | G01C 21/28 |
| | | | 701/468 |
| 2004/0243994 A1* | 12/2004 | Nasu | G06F 8/65 |
| | | | 717/171 |
| 2012/0102478 A1 | 4/2012 | Jeong | |
| 2013/0016654 A1 | 1/2013 | Mayo et al. | |
| 2013/0139140 A1* | 5/2013 | Rao | G06F 8/65 |
| | | | 717/170 |
| 2013/0185563 A1 | 7/2013 | Djabarov et al. | |
| 2013/0208627 A1* | 8/2013 | Picard | G08C 19/16 |
| | | | 370/255 |
| 2013/0283254 A1 | 10/2013 | Ocher | |
| 2014/0044016 A1 | 2/2014 | Rahman | |
| 2014/0089912 A1* | 3/2014 | Wang | G06F 8/65 |
| | | | 717/173 |
| 2014/0123123 A1 | 5/2014 | Bahls | |
| 2014/0245278 A1 | 8/2014 | Zellen | |
| 2015/0178064 A1* | 6/2015 | Cairns | G06F 8/65 |
| | | | 717/171 |
| 2015/0373089 A1* | 12/2015 | Koss | H04L 67/10 |
| | | | 709/205 |
| 2015/0378715 A1* | 12/2015 | Solnit | G06F 21/57 |
| | | | 713/2 |
| 2016/0132578 A1* | 5/2016 | Allen | H04L 67/26 |
| | | | 709/203 |
| 2016/0337169 A1* | 11/2016 | Chhabra | H04L 41/0672 |
| 2017/0308705 A1 | 10/2017 | Karaginides et al. | |
| 2018/0167224 A1* | 6/2018 | Brandt | H04B 7/15 |
| 2018/0359811 A1* | 12/2018 | Verzun | H04L 63/0428 |
| 2019/0065763 A1* | 2/2019 | Berg | G06F 16/58 |
| 2019/0205115 A1* | 7/2019 | Gomes | H04L 67/34 |
| 2019/0363927 A1* | 11/2019 | Ganeriwal | H04L 43/0811 |
| 2020/0082937 A1* | 3/2020 | Bodurka | H04W 4/50 |

* cited by examiner

SECURE SOFTWARE UPDATE IN A WIRELESS MESH RADIO NETWORK USING PEER-TO-PEER FILE SHARING

CROSS-REFERENCE TO RELATED APPLICATIONS

This application claims priority under 35 U.S.C. § 119(e) to U.S. Provisional Pat. App. No. 62/769,882, filed Nov. 20, 2018, titled "Secure Software Update in a Wireless Mesh Radio Network Using Peer-To-Peer File Sharing" which is hereby incorporated by reference in its entirety for all purposes. This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1.

This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes.

This document also hereby incorporates by reference U.S. Pat. Nos. 9,107,092, 8,867,418, and 9,232,547 in their entirety. This document also hereby incorporates by reference U.S. patent application Ser. Nos. 14/822,839, 15/828,427, U.S. Pat. App. Pub. Nos. US20170273134A1, US20170127409A1 in their entirety.

This application also hereby incorporates by reference in their entirety each of the following U.S. Pat. applications or Pat. App. Publications: US20180242396A1 (PWS-72501US02); US20150098387A1 (PWS-71731US01); US20170055186A1 (PWS-71815US01); US20170273134A1 (PWS-71850US01); US20170272330A1 (PWS-71850US02); and Ser. No. 15/713,584 (PWS-71850US03). This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

Features and characteristics of and pertaining to the systems and methods described in the present disclosure, including details of the multi-RAT nodes and the gateway described herein, are provided in the documents incorporated by reference.

BACKGROUND

The present invention relates generally to a wireless networking system, and in particular, to providing secure software updates of nodes within a wireless mesh network. Currently, each node in a wireless mesh network loads a software update from a Heterogenous Network Gateway (HNG). Updating each mesh node of the wireless mesh network directly from the HNG is a linear sequence and results in a highly inefficient use of time and bandwidth. From a user interface standpoint, the user must enter a Command Line Interface (CLI) command for each node. Each mesh node must download the release archive from the HNG through the Gateway Node (GN) backhaul connection. This becomes an issue even in the smallest of mesh networks (for example, 4 nodes or less). The further a node is located from the HNG the longer the download will take as traffic passes through peer nodes.

Accordingly, a flexible and cost-effective deployment model is needed for performing software updates on nodes of a wireless mesh network.

SUMMARY

This innovation provides novel method, system and architecture for updating mesh nodes in a wireless mesh network wherein a node will download and install an image and broadcast the image to its peers. A peer within the same wireless mesh network will download the image from the first peer it receives an image available notification from and ignore all others. In such a manner software updates are performed on all nodes of a wireless mesh network without requiring each node to separately load the software update from the HNG.

In one embodiment, a method may be disclosed for performing a secure software update in a mesh network. The method includes receiving, at each node of a network, a notification from a coordinating server, wherein each node of the network is listening for an image available notification; receiving, at a first node of the network, the image available notification; downloading and installing a software update image by the first node of the network; broadcasting, at the first node of the network, the image available notification to other peer nodes of the first node of the network; and downloading and installing the software update image from the first node of the network by at least one other peer node of the network.

In another embodiment, a system may be provided for performing a secure software update in a network, the system comprising: a Heterogeneous Network Gateway (HNG); a Gateway Node (GN) in communication with the HNG; a plurality of nodes, wherein each node is in communication with at least one other node, and wherein at least one node is in communication with the GN; wherein each node of the network receives a notification from the HGN resulting in each node of the network listening for an image available notification; wherein a first node of the network receives the image available notification, downloads and installs a software update image, and broadcasts the image available notification to other peer nodes of the first node of the network; wherein at least one other peer node downloads and installs the software update image from the first node.

In another embodiment a non-transitory computer-readable medium containing instructions for performing a secure software update in a mesh network, when executed, cause a system to perform steps comprising: receiving, at each node of a network, a notification from a coordinating server, wherein each node of the network is listening for an image available notification; receiving, at a first node of the network, the image available notification; downloading and installing a software update image by the first node of the network; broadcasting, at the first node of the network, the image available notification to other peer nodes of the first node of the network; and downloading and installing the software update image from the first node of the network by at least one other peer node of the network.

Other aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

In various embodiments, this invention enables an orchestrated software update of all nodes within a wireless mesh network by an orchestrating node known as a Heterogeneous Network Gateway (HNG). The HNG and the various wireless mesh nodes comprise a Virtualized e-NodeB system (vENB). This secure update process covers nodes which share one or more backhaul links to an HNG.

The secure update process is orchestrated by the HNG. The HNG node maintains the software update image which is to be propagated to all wireless mesh nodes comprising the vENB system. The HNG node is also responsible for originating the signaling for every node within the mesh regarding the update procedure as well as meta-data about the software update image. The signaling instructions provided by the HNG as well as the software package are propagated from a wireless mesh node to all of its peers therefore improving efficiency in regard to bandwidth usage.

An update is initiated on the HNG using a Command Line Interface (CLI) command. The CLI command takes a Uniform Resource Locator (URL) which contains the network location, credentials, and update image file name (the "image"). The URL is sent to the mesh node where it is used to download and the install the image.

A node's download path is dictated by its role and place in the mesh network. The download path for a gateway node (GN) is a direct backhaul connection to the HNG. The download path for a mesh node (MN) is determined by its proximity to the GN so it can be either through the GN or a peer MN connected to the GN. Sometimes these hops are more than one node away from the GN. The deeper a mesh node is in the network the more nodes its download path traverses.

Figure 1:
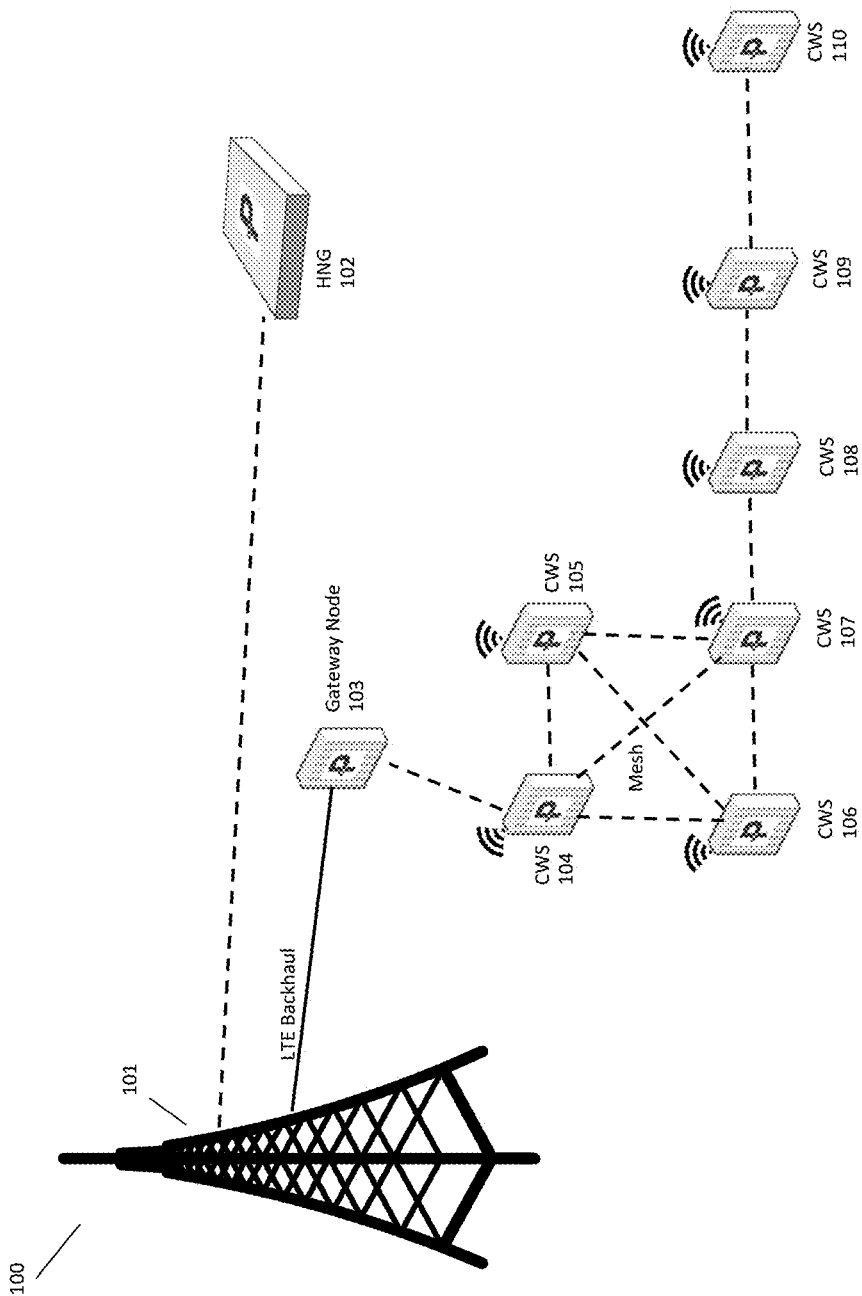
FIG. 1 depicts a diagram of a wireless mesh network consistent with an embodiment of the present disclosure.

Referring to FIG. 1, a wireless mesh network environment is shown including an HNG in communication with a wireless mesh network. The wireless mesh network includes a gateway node (GN), four mesh nodes (CWS 104, CWS 105, CWS 106, CWS 107) and three peer nodes (CWS 108, CWS 109 and CWS 110).

An example download path for mesh node CWS 106 is GN 103→CWS 104→CWS 106. A secure peer-to-peer file sharing protocol is implemented to facilitate the downloading of the image directly from a peer. A peer-to-peer protocol is established whereby in response to the HNG notification all nodes will be listening for an "image available" notification from all peers. The first time a node receives the image available notification, the node will download and install the image and broadcast the image available to its peers. Each node will send an Acknowledgement (ACK) to the HNG after receiving the image. Peers within the same mesh (CWS 104-107 in FIG. 1) will all download from the first peer it receives the image available message from and ignore all others.

Using FIG. 1 again to illustrate this point consider CWS 107. When CWS 107 downloads and installs the image, its broadcast of the image available message will be ignored by CWS 104, CWS 105 and CWs 106 since they have previously received the image available message but will be acknowledged by CWS 108. CWS 108 will download the image from CWS 107 and install the image. CWS 108 will send an ACK to the HNG 102, then broadcast an image available message to CWS 109. CWS 109 will download the image from CWS 108 and install the image. CWS 109 will send an ACK to the HNG 102, then broadcast an image available message to CWS 110. CWS will send an ACK to the HNG 102, then will download the image from CWS 109 and install the image.

Figure 2:
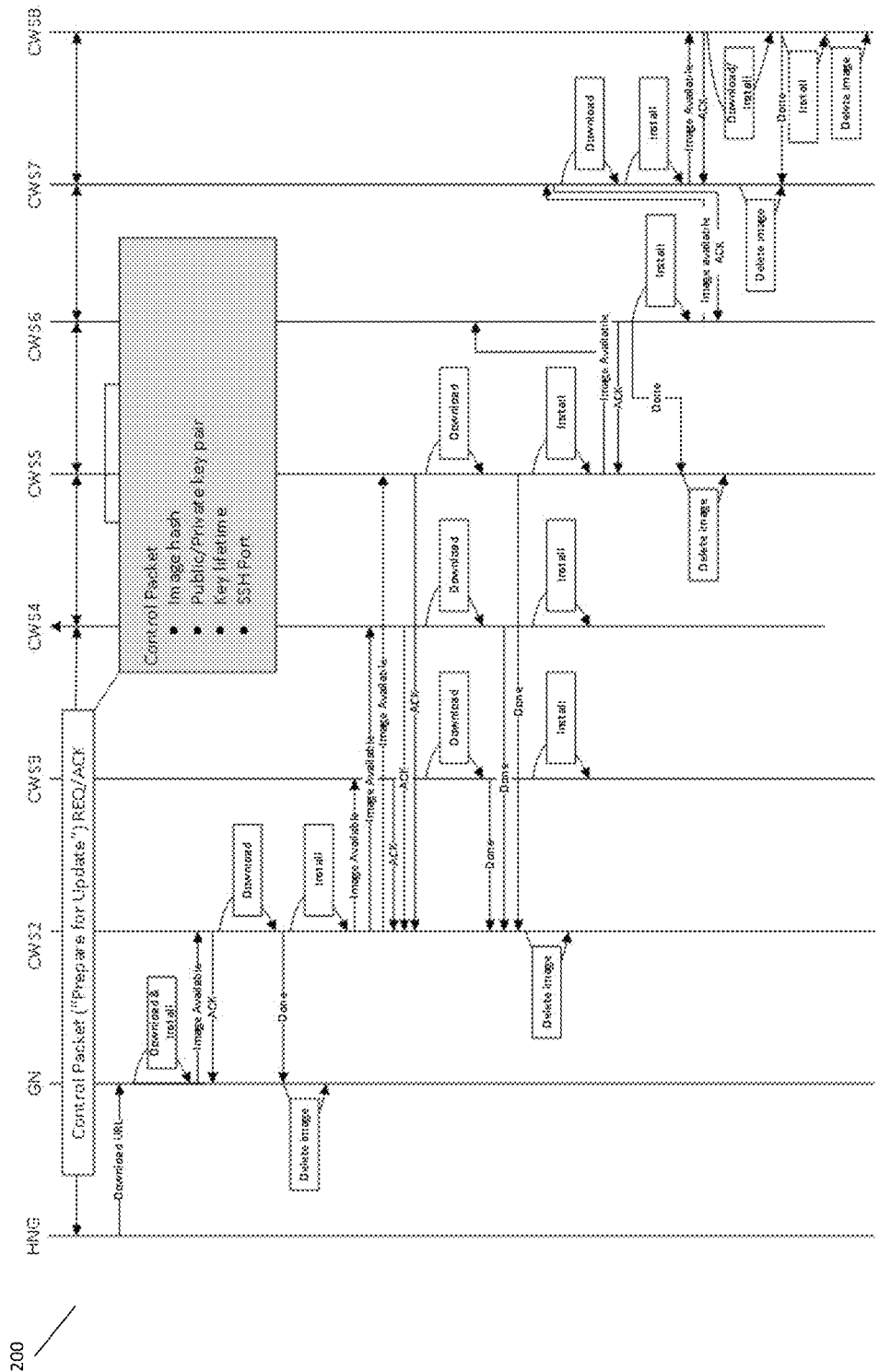
FIG. 2 depicts a sequence diagram illustrating a mesh update consistent with an embodiment of the present disclosure.

The sequence diagram 200 shown in FIG. 2 illustrates the mesh update of the network shown in FIG. 1. The update sequence will start by broadcasting a control packet to all nodes. The control packet will be sent over the existing IPsec tunnel, which means the content will be encrypted. The control packet will be small in size and contain the following information:

Image hash (checksum used to verify digitally signed image)

Public/Private key pair used for authentication between peers

Key lifetime (the lifespan of the Public/Private keys)

SSH Port (optional non-standard port peers will use for SSH)

When a node makes an image available for download by a peer it will create a SFTP Chroot Jail and open an SSH port from where the peer can download the image. The peer will initiate a SFTP session with the serving peer authenticating with the Public/Private keys. Once authenticated the client peer will download the image and inform the serving peer it is done. Once all nodes are done downloading, or a timeout occurs, the node will close the SSH port and delete the keys and the file.

After downloading the image, the CWS will begin installing the image. Once install is complete the CWS will notify the HNG that update is complete by sending a Node Armed message. A node is considered armed when an image has been successfully installed and will execute following a node reboot.

A CWS has three distinct partitions in flash where images are installed: Active, Next, and Previous. The Active partition is the partition from which the current software is executing. The Next partition is where software updates are installed. The Previous partition is the formerly active partition and is the rollback candidate should one be required. Rollback is when the Previous partition is marked Active and the node rebooted.

During the update process a partition is only marked Next following a successful install. The next partition will become the active partition following a reboot and the previously Active partition will become the Previous partition.

By design, a failed update results in no change of partition status. For example, if a power cycle occurs while Active partition A is updating Next partition B, no partition state changes. Once power restores Partition A will boot intact.

There are two audits performed by the HNG during mesh software update: Node Armed and Node Operational. Node Armed will verify the software has been successfully installed. Node Operational will verify the updated software successfully achieves operational status.

The HNG will perform a periodic audit of comparing the number of ACKs received from the initial Control Packet and number of Node Armed messages received. The audit process will have a timeout that if reached will result in another attempt at updating the node(s) which failed to send a Node Armed message.

If enough nodes timeout the HNG can choose to negate the update on all nodes by sending a rollback message to all nodes. The number of nodes that fail to reach the Armed state invoking the rollback policy will be implemented using a configurable threshold. Upon receiving the rollback message all nodes will revert partition statuses to pre-update. The Next label will be removed from the next partition and the Active partition will remain active.

Once all nodes are in the Armed state the HNG will begin to verify the upgrade by rebooting a select number of nodes. A node will be considered Operational when it connects to the HNG and solicits, receives, and invokes configuration from the HNG and the node achieves an InService state. If a node's state is conFIG. d to be Disabled, then Operational Status will be determined by the node's connectivity state (with respect to the HNG). If a node or nodes fail to achieve Operational status the HNG can rollback all nodes in the Armed state. The number of nodes that fail to achieve Operational invoking the rollback policy are configurable using a threshold.

Figure 3:
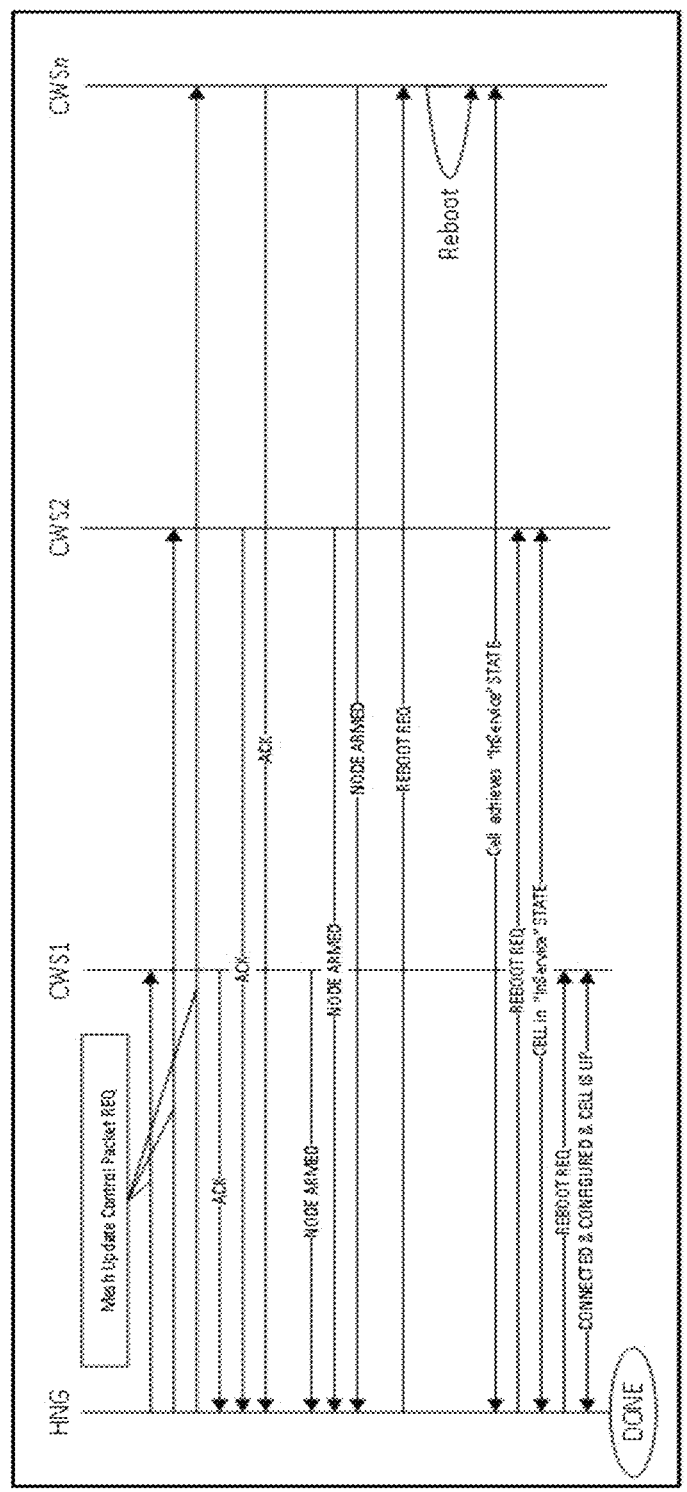
FIG. 3 depicts a sequence diagram illustrating a successful mesh update consistent with an embodiment of the present disclosure.

FIG. 3 illustrates a successful mesh network update 300. In this example the nodes CWS1, CWS2 and CWSn receive the image and install the image. Each node sends an ACK after receiving the image. The image is installed successfully on each node and each node sends a NODE ARMED response indicating the successful installation of the image. The nodes are rebooted after the successful installation. All nodes achieve InService state after rebooting from the NODE ARMED state.

Figure 4:
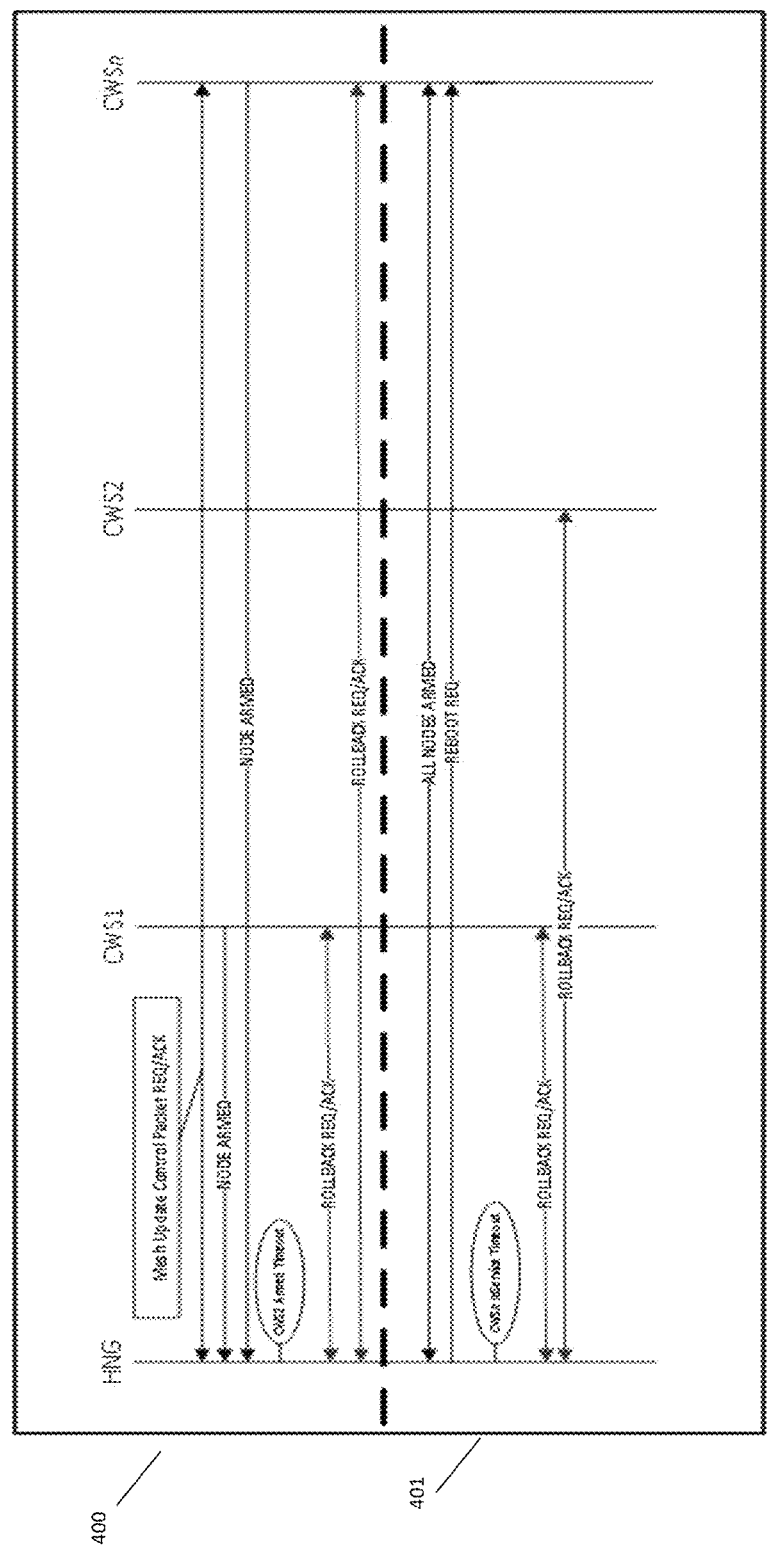
FIG. 4 depicts a sequence diagram illustrating error scenarios for a mesh update consistent with an embodiment of the present disclosure.

FIG. 4 illustrates two error scenarios 400 and 401. The first error scenario 400 is referred to as an armed state timeout (during install). In this example, CWS1 has downloaded the image and successfully installed the image. CWS1 sends a NODE ARMED response. A similar situation occurs with CWS3 which has downloaded the image, successfully installed the image, and sent a NODE ARMED response. CWS2 however has not sent a NODE ARMED response. A timeout occurs after a predetermined period of time is reached without receiving the NODE ARMED response from CWS2. As a result of this error condition, a rollback operation is performed. This ensures that all nodes are at the same software version.

A second error scenario 401 is referred to as an InService timeout (reboot after install). In this scenario, all nodes are armed and rebooted. CWSn however does not achieve an In Service state. As a result of this error condition, a rollback operation is performed. This ensures that all nodes are at the same software version.

Figure 5:
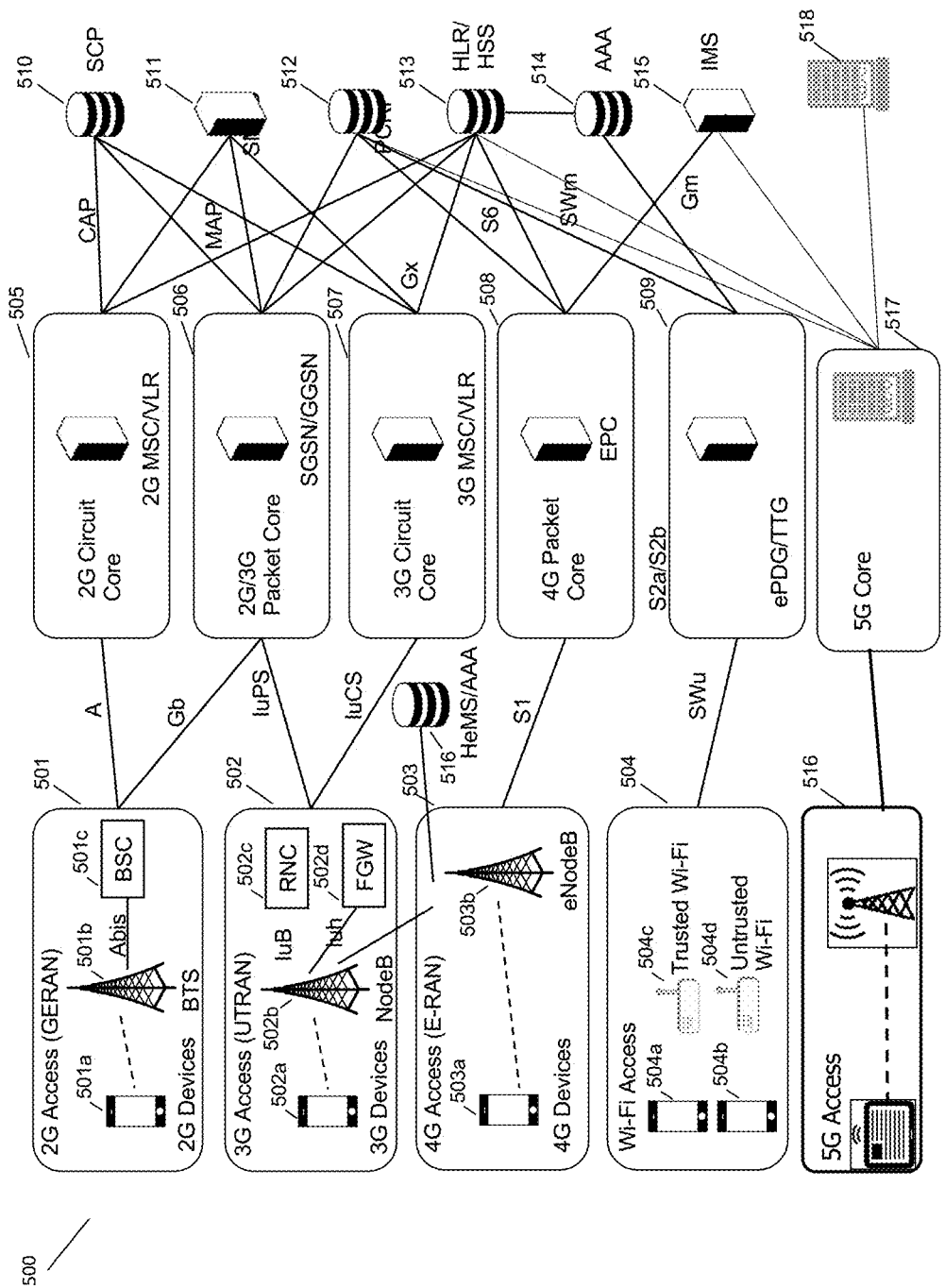
FIG. 5 is a schematic network architecture diagram for various radio access technology core networks.

FIG. 5 is a schematic network architecture diagram 500 for 3G and other-G prior art networks. The diagram shows a plurality of "Gs," including 2G, 3G, 4G, 5G and Wi-Fi. 2G is represented by GERAN 501, which includes a 2G device 501a, BTS 501b, and BSC 501c. 3G is represented by UTRAN 502, which includes a 3G UE 502a, nodeB 502b, RNC 502c, and femto gateway (FGW, which in 3GPP namespace is also known as a Home nodeB Gateway or HNBGW) 502d. 4G is represented by EUTRAN or E-RAN 503, which includes an LTE UE 503a and LTE eNodeB 503b. Wi-Fi is represented by Wi-Fi access network 504, which includes a trusted Wi-Fi access point 504c and an untrusted Wi-Fi access point 504d. The Wi-Fi devices 504a and 504b may access either AP 504c or 504d. In the current network architecture, each "G" has a core network. 2G circuit core network 505 includes a 2G MSC/VLR; 2G/3G packet core network 506 includes an SGSN/GGSN (for EDGE or UMTS packet traffic); 3G circuit core 507 includes a 3G MSC/VLR; 4G circuit core 508 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 530, the SMSC 531, PCRF 532, HLR/HSS 533, Authentication, Authorization, and Accounting server (AAA) 534, and IP Multimedia Subsystem (IMS) 535. An HeMS/AAA 536 is present in some cases for use by the 3G UTRAN. The diagram is used to indicate schematically the basic functions of each network as known to one of skill in the art, and is not intended to be exhaustive. For example, 5G core 517 is shown using a single interface to 5G access 516, although in some cases 5G access can be supported using dual connectivity or via a non-standalone deployment architecture.

Noteworthy is that the RANs 501, 502, 503, 504 and 536 rely on specialized core networks 505, 506, 507, 508, 509, 537 but share essential management databases 530, 531, 532, 533, 534, 535, 538. More specifically, for the 2G GERAN, a BSC 501c is required for Abis compatibility with BTS 501*b*, while for the 3G UTRAN, an RNC 502*c* is required for Iub compatibility and an FGW 502*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 6:
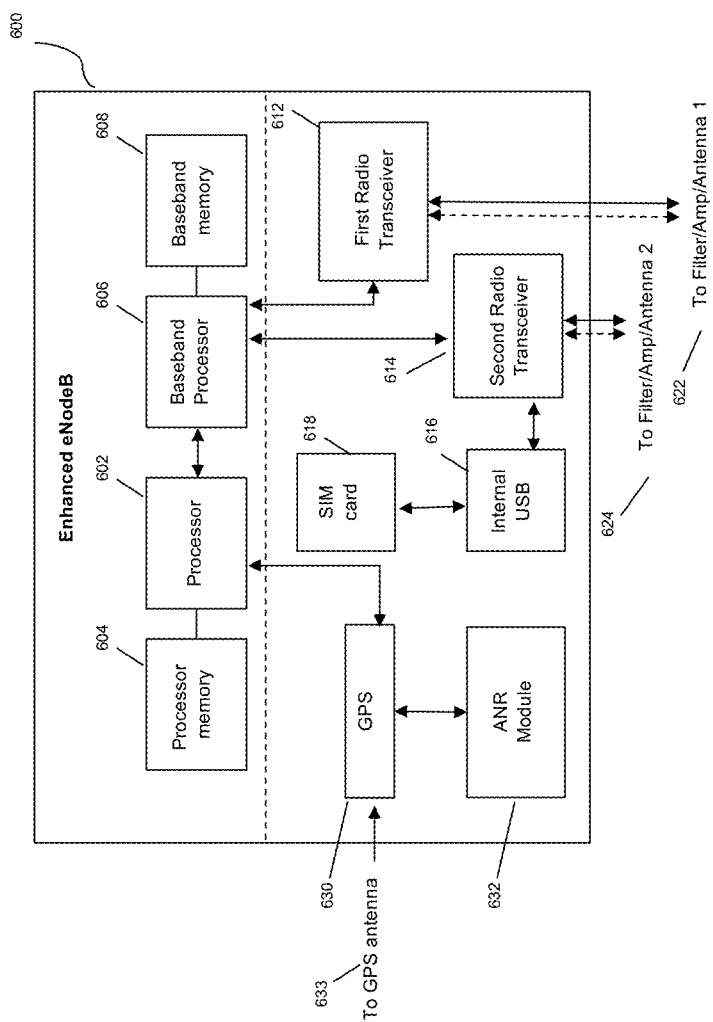
FIG. 6 is an enhanced eNodeB for performing the methods described herein, in accordance with some embodiments.

FIG. 6 is an enhanced base station 600 for performing the methods described herein, in accordance with some embodiments. Base station 600 may include processor 602, processor memory 604 in communication with the processor, baseband processor 606, and baseband processor memory 608 in communication with the baseband processor. Mesh network node 600 may also include first radio transceiver 612 and second radio transceiver 614, internal universal serial bus (USB) port 616, and subscriber information module card (SIM card) 618 coupled to USB port 616. In some embodiments, the second radio transceiver 614 itself may be coupled to USB port 616, and communications from the baseband processor may be passed through USB port 616. The second radio transceiver may be used for wirelessly backhauling eNodeB 600.

Processor 602 and baseband processor 606 are in communication with one another. Processor 602 may perform routing functions, and may determine if/when a switch in network configuration is needed. Baseband processor 606 may generate and receive radio signals for both radio transceivers 612 and 614, based on instructions from processor 602. In some embodiments, processors 602 and 606 may be on the same physical logic board. In other embodiments, they may be on separate logic boards.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 612 and 614. Baseband processor 606 may use memory 608 to perform these tasks.

The first radio transceiver 612 may be a radio transceiver capable of providing LTE eNodeB functionality, and may be capable of higher power and multi-channel OFDMA. The second radio transceiver 614 may be a radio transceiver capable of providing LTE UE functionality. Both transceivers 612 and 614 may be capable of receiving and transmitting on one or more LTE bands. In some embodiments, either or both of transceivers 612 and 614 may be capable of providing both LTE eNodeB and LTE UE functionality. Transceiver 612 may be coupled to processor 602 via a Peripheral Component Interconnect-Express (PCI-E) bus, and/or via a daughtercard. As transceiver 614 is for providing LTE UE functionality, in effect emulating a user equipment, it may be connected via the same or different PCI-E bus, or by a USB bus, and may also be coupled to SIM card 618. First transceiver 612 may be coupled to first radio frequency (RF) chain (filter, amplifier, antenna) 622, and second transceiver 614 may be coupled to second RF chain (filter, amplifier, antenna) 624.

SIM card 618 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 612 and 614, which may be 3G, 4G, 5G, Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 602 for reconfiguration.

A GPS module 630 may also be included, and may be in communication with a GPS antenna 632 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 632 may also be present and may run on processor 602 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 7:
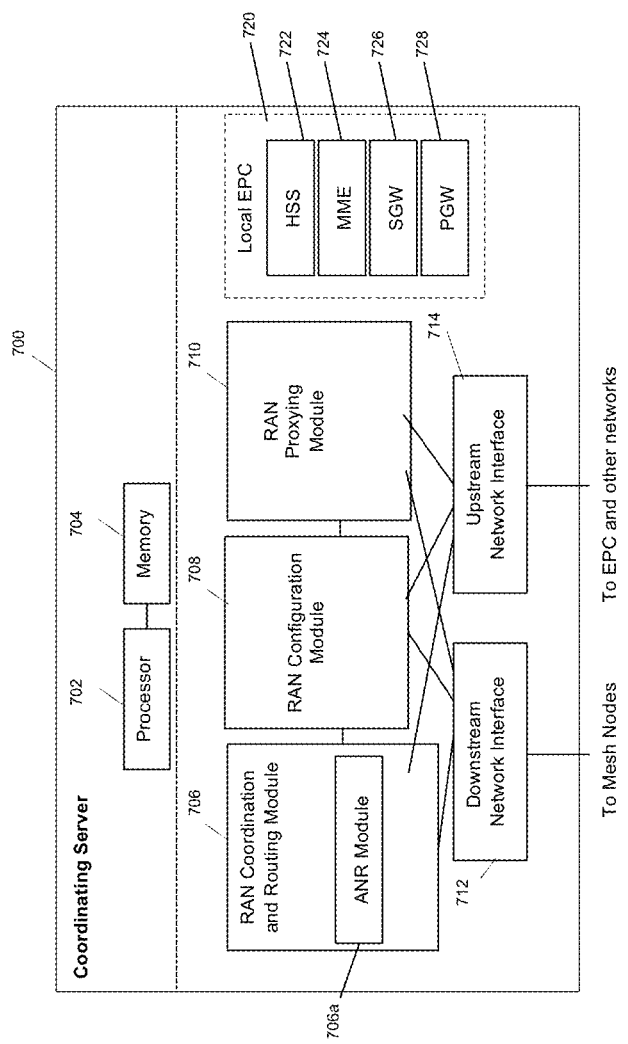
FIG. 7 is a coordinating server for providing services and performing methods as described herein, in accordance with some embodiments.

FIG. 7 is a coordinating server 700 for providing services and performing methods as described herein, in accordance with some embodiments. Coordinating server 700 includes processor 702 and memory 704, which are conFIG.d to provide the functions described herein. Also present are radio access network coordination/routing (RAN Coordination and routing) module 706, including ANR module 706*a*, RAN configuration module 708, and RAN proxying module 710. The ANR module 706*a* may perform the ANR tracking, PCI disambiguation, ECGI requesting, and GPS coalescing and tracking as described herein, in coordination with RAN coordination module 706 (e.g., for requesting ECGIs, etc.). In some embodiments, coordinating server 700 may coordinate multiple RANs using coordination module 706. In some embodiments, coordination server may also provide proxying, routing virtualization and RAN virtualization, via modules 710 and 708. In some embodiments, a downstream network interface 712 is provided for interfacing with the RANs, which may be a radio interface (e.g., LTE), and an upstream network interface 714 is provided for interfacing with the core network, which may be either a radio interface (e.g., LTE) or a wired interface (e.g., Ethernet).

Coordinator 700 includes local evolved packet core (EPC) module 720, for authenticating users, storing and caching priority profile information, and performing other EPC-dependent functions when no backhaul link is available. Local EPC 720 may include local HSS 722, local MME 724, local SGW 726, and local PGW 728, as well as other modules. Local EPC 720 may incorporate these modules as software modules, processes, or containers. Local EPC 720 may alternatively incorporate these modules as a small number of monolithic software processes. Modules 706, 708, 710 and local EPC 720 may each run on processor 702 or on another processor, or may be located within another device.

The protocols described herein have largely been adopted by the 3GPP as a standard for the upcoming 5G network technology as well, in particular for interfacing with 4G/LTE technology. For example, X2 is used in both 4G and 5G and is also complemented by 5G-specific standard protocols called Xn. Additionally, the 5G standard includes two phases, non-standalone (which will coexist with 4G devices and networks) and standalone, and also includes specifications for dual connectivity of UEs to both LTE and NR ("New Radio") 5G radio access networks. The inter-base station protocol between an LTE eNB and a 5G gNB is called Xx. The specifications of the Xn and Xx protocol are understood to be known to those of skill in the art and are hereby incorporated by reference dated as of the priority date of this application.

In some embodiments, several nodes in the 4G/LTE Evolved Packet Core (EPC), including mobility management entity (MME), MME/serving gateway (S-GW), and MME/S-GW are located in a core network. Where shown in the present disclosure it is understood that an MME/S-GW is representing any combination of nodes in a core network, of whatever generation technology, as appropriate. The present disclosure contemplates a gateway node, variously described as a gateway, HetNet Gateway, multi-RAT gateway, LTE Access Controller, radio access network controller, aggregating gateway, cloud coordination server, coordinating gateway, or coordination cloud, in a gateway role and position between one or more core networks (including multiple operator core networks and core networks of heterogeneous RATs) and the radio access network (RAN). This gateway node may also provide a gateway role for the X2 protocol or other protocols among a series of base stations. The gateway node may also be a security gateway, for example, a TWAG or ePDG. The RAN shown is for use at least with an evolved universal mobile telecommunications system terrestrial radio access network (E-UTRAN) for 4G/LTE, and for 5G, and with any other combination of RATs, and is shown with multiple included base stations, which may be eNBs or may include regular eNBs, femto cells, small cells, virtual cells, virtualized cells (i.e., real cells behind a virtualization gateway), or other cellular base stations, including 3G base stations and 5G base stations (gNBs), or base stations that provide multi-RAT access in a single device, depending on context.

In the present disclosure, the words "eNB," "eNodeB," and "gNodeB" are used to refer to a cellular base station. However, one of skill in the art would appreciate that it would be possible to provide the same functionality and services to other types of base stations, as well as any equivalents, such as Home eNodeBs. In some cases Wi-Fi may be provided as a RAT, either on its own or as a component of a cellular access network via a trusted wireless access gateway (TWAG), evolved packet data network gateway (ePDG) or other gateway, which may be the same as the coordinating gateway described hereinabove.

The word "X2" herein may be understood to include X2 or also Xn or Xx, as appropriate. The gateway described herein is understood to be able to be used as a proxy, gateway, B2BUA, interworking node, interoperability node, etc. as described herein for and between X2, Xn, and/or Xx, as appropriate, as well as for any other protocol and/or any other communications between an LTE eNB, a 5G gNB (either NR, standalone or non-standalone). The gateway described herein is understood to be suitable for providing a stateful proxy that models capabilities of dual connectivity-capable handsets for when such handsets are connected to any combination of eNBs and gNBs. The gateway described herein may perform stateful interworking for master cell group (MCG), secondary cell group (SCG), other dual-connectivity scenarios, or single-connectivity scenarios.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the FIG. s and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method of performing a secure software update in a mesh network, the method comprising:
 receiving, at each node of a network, a notification from a coordinating server wherein each node of the network is listening for an image available notification;
 receiving, at a first node of the network, the image available notification;
 downloading and installing a software update image by the first node of the network;
 broadcasting, at the first node of the network, the image available notification to other peer nodes of the first node of the network;
 downloading and installing the software update image from the first node of the network by at least one other peer node of the network; and
 performing a periodic audit comparing a number of ACKs received from the initial control packet and a number of node armed messages received.

2. The method of claim 1 further comprising performing a rollback on all nodes when the update does not complete or the system does not reboot after the update.

3. The method of claim 1 further comprising sending, by each node, an acknowledgement (ACK) after receiving the image.

4. The method of claim 1 wherein an update starts by broadcasting a control packet to all nodes.

5. The method of claim 4 wherein the control packet includes an image hash, a public/private key pair for authentication between peers, a key lifetime for the public/private keys, and a Secure Shell (SSH) port.

6. The method of claim 5 further comprising, when a node makes an image available for download by a peer, opening the SSH port by the peer from where the peer can download the image.

7. The method of claim 6 further comprising initiating, by the peer, a SFTP session with the node, and authenticating with the private/public keys.

8. The method of claim 7 further comprising closing the SSH port and deleting the public/private keys and the image once all nodes are done downloading or a timeout occurs.

9. A system for performing a secure software update in a network, the system comprising:
   a Heterogeneous Network Gateway (HNG);
   a Gateway Node (GN) in communication with the HNG;
   a plurality of nodes, wherein each node is in communication with at least one other node, and wherein at least one node is in communication with the GN;
   wherein each node of the network receives a notification from the HGN resulting in each node of the network listening for an image available notification;
   wherein a first node of the network receives the image available notification, downloads and installs a software update image, and broadcasts the image available notification to other peer nodes of the first node of the network;
   wherein at least one other peer node downloads and installs the software update image from the first node; and
   wherein a periodic audit is performed comparing a number of ACKs received from the initial control packet and a number of node armed messages received.

10. The system of claim 9 wherein a rollback is performed on all nodes when the update does not complete or the system does not reboot after the update.

11. The system of claim 9 wherein each node sends an acknowledgement (ACK) after receiving the image.

12. The system of claim 9 wherein an update starts when a control packet is broadcast to all nodes.

13. The system of claim 12 wherein the control packet includes an image hash, a public/private key pair for authentication between peers, a key lifetime for the public/private keys, and a Secure Shell (SSH) port.

14. The system of claim 13 wherein when a node makes an image available for download by a peer, the SSH port is opened by the peer from where the peer can download the image.

15. The system of claim 14 wherein the peer initiates an SFTP session with the node, and authenticates with the private/public keys.

16. The system of claim 15 wherein the SSH port is closed and wherein the public/private keys and the image are deleted once all nodes are done downloading or a timeout occurs.

17. A non-transitory computer-readable medium containing instructions for performing a secure software update in a mesh network, when executed, cause a system to perform steps comprising:
   receiving, at each node of a network, a notification from a coordinating server wherein each node of the network is listening for an image available notification;
   receiving, at a first node of the network, the image available notification;
   downloading and installing a software update image by the first node of the network;
   broadcasting, at the first node of the network, the image available notification to other peer nodes of the first node of the network;
   downloading and installing the software update image from the first node of the network by at least one other peer node of the network; and
   wherein a periodic audit is performed comparing a number of ACKs received from the initial control packet and a number of node armed messages received.

18. The computer-readable medium of claim 17 further comprising instructions for performing a rollback on all nodes when the update does not complete or the system does not reboot after the update.

* * * * *